3,440,046
LIGHT INDUCED IMAGING OF SELENIUM IN THE PRESENCE OF CADMIUM OR MERCURY VAPORS

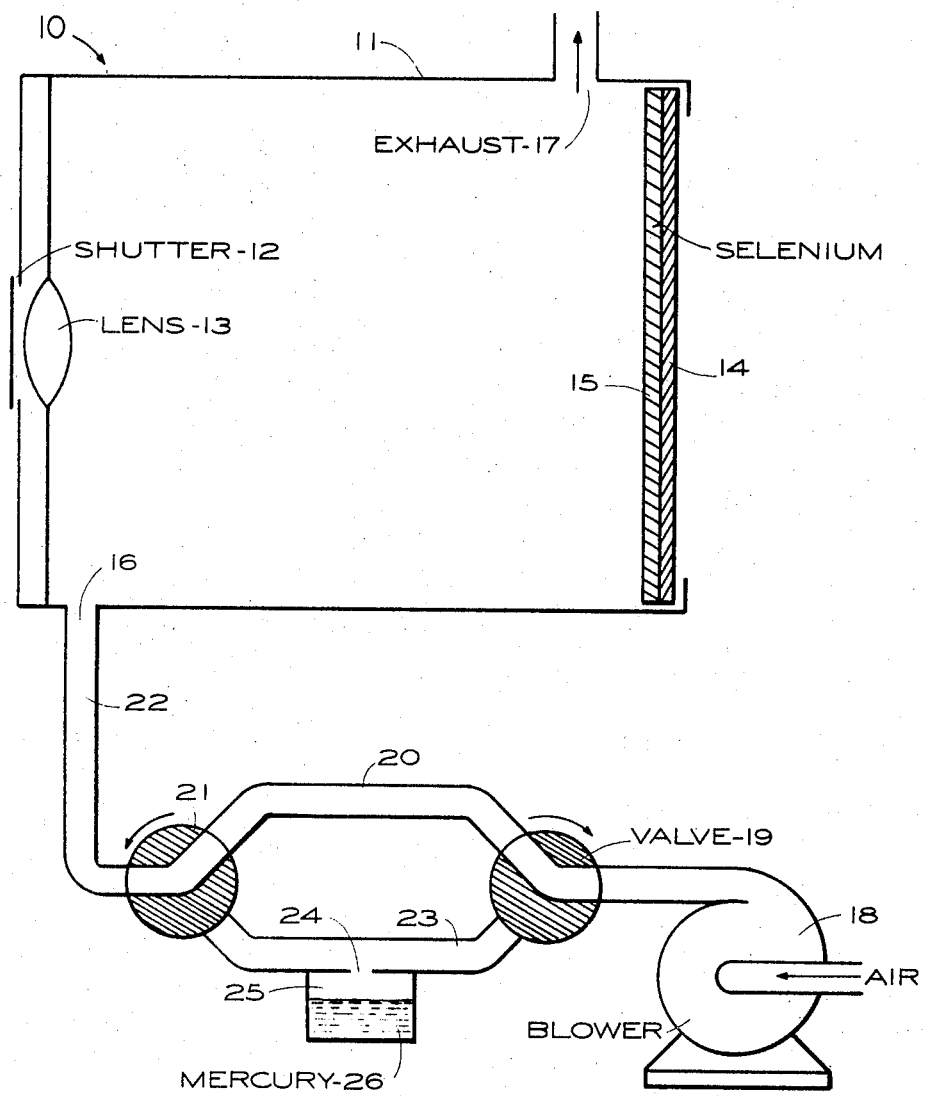

John W. Droege and Carl W. Melton, Columbus, Ohio, assignors, by mesne assignments, to The Battelle Development Corporation, Columbus, Ohio, a corporation of Delaware
Filed Oct. 22, 1965, Ser. No. 501,020
Int. Cl. G03c 5/04, 5/24
U.S. Cl. 96—27            4 Claims

ABSTRACT OF THE DISCLOSURE

A fixed visible image or other detectable image of high resolution is provided by focusing an image of light on a solid or amorphous surface of selenium and contacting the surface with mercury vapor or cadmium vapor.

---

This invention relates to methods and apparatus for providing detectable variations on surfaces of photosensitive material, and is especially useful for providing photographic images having extremely high resolution.

In brief, the invention includes a method and apparatus for providing a detectable variation on a surface of photosensitive material by exposing the surface to radiation and contacting the surface with a fluid, typically a gas, capable of reacting therewith at a given point in a manner that varies as a function of the intensity of the radiation theron. Preferably the exposing comprises directing radiation of variable intensity on at least a portion of the surface, as by focusing a radiated image on the surface.

The method and apparatus of this invention are especially useful for providing a detectable image on a surface of selenium by focusing an image of light on the surface and contacting the surface with mercury vapor or cadmium vapor. For example, a fixed visible image of high resolution is provided on a solid or amorphous surface of selenium by focusing an image of light on the surface and contacting the surface with mercury vapor or cadmium vapor.

In the drawing, the figure is a schematic, mostly cross-sectional, view of typical apparatus according to the present invention.

The invention provides a method of producing a photographic image in such a way that no mechanical manipulation is required for developing and fixing the image. The image is characterized by high resolution not limited by the grain size of the photographic plate. The plate and image are such as to be usable ot provide the inputs for electronic read-out and transmittal equipment. A relief image is produced that may be used for reproduction by processes in the general nature of offset printing.

In photography it is necessary that the process by which an image or latent image is produced be stopped before the plate is exposed to other illumination. The image must also be rendered visible or otherwise changed into usable form. Most processes of development and fixing require mechanical and chemical manipulation. In the present process, the image is produced by chemical reaction, under the influence of light or other electromagnetic radiation, between reactants of which one is in the vapor phase. The process is stopped simply by removing the gaseous reactant. Electronic methods of photography, such as those used in television, in which the information may be stored, as on magnetic tape or otherwise, suffer the disadvantages of limited resolution and relatively high requirements of incident light. The present method gives very high resolution and requires only low levels of incident radiation.

In a preferred form of this invention, the photographic plate consists of a suitable reactive material, preferably amorphous, deposited on a suitable backing for support. The surface is exposed to a low concentration in the vapor phase of a material with which it will undergo photochemical reaction. By means of a suitable optical arrangement an image is brought to focus on the surface. The image is developed on the surface by reaction of the vapor with the solid material, the reaction being influenced by the light striking the surface. The reaction is stopped by interrupting the light or, preferably, by removing the reactive gas.

An example of the photographic plate is an aluminum plate on which has been deposited a layer of vitreous selenium, which may typically be 0.05 mm. thick or less. The plate is exposed to vapors of a reactive material, preferably mercury, while an image is brought to focus on the surface, as by means of a pin-hole camera. The image consists of particles, as of mercury selenide, the particle size being of the order of 0.2 micron in diameter. The particles are formed in the presence of light. The resolution is not limited by the size of particles or grains of the reactant, selenium in this case, since it is present in a vitreous state.

Another material suitable for the formation of images on selenium is cadmium. However, the vapor pressure of cadmium metal at ordinary temperatures is very low, and the development of an image requires either very long times or somewhat elevated temperatures.

The reaction which produces the fixed image on the plate may result in a change of color or light scattering, as in the case of mercury selenide, so that the image is immediately visible. But the usefulness of the fixed image is not limited to the visible effect alone. In the case of the selenium plate, the vitreous coating is photoconductive. This makes possible the use of electronic means for reading and transmitting the image. In the absence of light, an electrostatic charge is held on the surface of the selenium. In the presence of light the charge is transmitted through the selenium to the metal plate. The transmission of charge does not take place at the points covered by mercury selenide. The transmitted charge may be detected and amplified in such a way that the image may be reproduced remotely. The change in surface properties brought about by the reaction products may also be utilized in other ways. For example, various liquids, which may be pigmented, will adhere preferentially to the mercury selenide particles and may so be transferred to another surface, as of paper, for example. Other methods of transmitting the image may be based, for example, on the variation in infrared transmission or on changes in electrical properties of the surface.

Although the range of application of the invention is wide, the particular advantageous characteristics which seem to be most important are these: A minimum of manipulation is required, since the image is developed and fixed as the exposure is being made, requiring no more than the removal of the reactant vapor to stop the process. The resolution obtainable is very high, apparently being limited only by the sharpness of focus of the image on the plate, or by the minimum product particle size obtainable in the form of a useful image. Where a photoconductive material is used, the process lends itself to remote reading. The intensity of light required, with the proper choice of reactants, is very low.

The figure shows schematically a typical form of apparatus that can be used in carrying out the invention. A camera 10 is housed in an enclosure 11, the front face of which has an opening in its center that can be covered and uncovered by a shutter 12. Behind the shutter 12 is a lens 13 for focusing an image on a plate 14 made of aluminum and having a layer of vitreous selenium 15 on its front face. The enclosure 11 is provided with an inlet 16 and an exhaust outlet 17.

A blower 18 blows air through a valve 19, tubing 20, a valve 21, and tubing 22, to the inlet 16, through the camera 10, and out the exhaust outlet 17. By turning the valves 19 and 21 to their alternate positions, the blower 18 is connected through the valve 19, tubing 23, the valve 21, and tubing 22 to the inlet 16. The tubing 23 has an opening 24 above a vessel 25 containing a pool of mercury 26. When air is blown through the tubing 23, mercury vapor is drawn through the opening 24 into the tubing 23, through the valve 21 and tubing 22 to the inlet 16, through the camera 10, and out the exhaust outlet 17. Some of the vapor of course contacts the selenium coating 15 on the aluminum plate 14.

In operation the camera 10 is pointed toward the subject of which an image is desired, and the shutter 12 is opened for a suitable time during which light from the subject is focused by the lens 13 onto the selenium coating 15 on the plate 14. The valves 19 and 21 are set at their positions alternate to those shown in the drawing, wherein they connect the blower 18 and the tubing 22, respectively, to the tubing 23. The blower 18 is turned on and blows air and mercury vapor into the camera 10, causing some of the mercury vapor to contact the selenium surface 15 and to react therewith at each point thereon in a manner that varies as a function of the intensity of the light from the subject focused thereon by the lens 13. The shutter 12 is closed and the valves 19 and 21 are turned to the positions shown in the drawing connecting the blower 18 and the tubing 22, respectively, to the tubing 20. The air from the blower 18 is thus directed through the camera 10 to remove the mercury vapor therefrom through the exhaust outlet 17. The plate 14 may be removed from the camera 10 and replaced with a new plate 14 having a coating 15 of selenium thereon for recording the image of another subject in the same manner. The exposed and fixed image on the selenium surface 15 of the first plate 14 may be used as a visible image or it may be used in any suitable way, such as those mentioned above, for printing or other forms of reproduction of the image.

While the forms of the invention herein disclosed constitute presently preferred embodiments, many others are possible, and it is not intended to describe or mention all of the possible equivalent forms or ramifications of the invention. It is to be understood that the words used are terms of description rather than of limitation, and that various changes may be made without departing from the spirit or scope of the invention.

What is claimed is:

1. A method of providing a detectable image on a surface of selenium that comprises focusing an image of light on said surface and contacting said surface with mercury vapor or cadmium vapor.

2. A method of providing a fixed visible image of high resolution on a solid or amorphous surface of selenium that comprises focusing an image of light on said surface and contacting said surface with mercury vapor or cadmium vapor.

3. A method of providing a detectable image on a surface of selenium that comprises focusing an image of light on said surface and contacting said surface with mercury vapor.

4. A method of providing a fixed visible image of high resolution on a solid or amorphous surface of selenium that comprises focusing an image of light on said surface and contacting said surface with mercury vapor.

References Cited

UNITED STATES PATENTS 3,095,341   6/1963   Ligenza _____ 156—17

NORMAN G. TORCHIN, *Primary Examiner.*

J. R. EVERETT, *Assistant Examiner.*

U.S. Cl. X.R.

96—88, 119

Dedication 3,440,046.—*John W. Droege* and *Carl W. Melton*, Columbus, Ohio. LIGHT INDUCED IMAGING OF SELENIUM IN THE PRESENCE OF CADMIUM OR MERCURY VAPORS. Patent dated Apr. 22, 1969. Dedication filed Sept. 11, 1975, by the assignee, *The Battelle Development Corporation*.

Hereby dedicates to the People of the United States the entire remaining term of said patent.

[*Official Gazette November 11, 1975.*]